Figure 1:
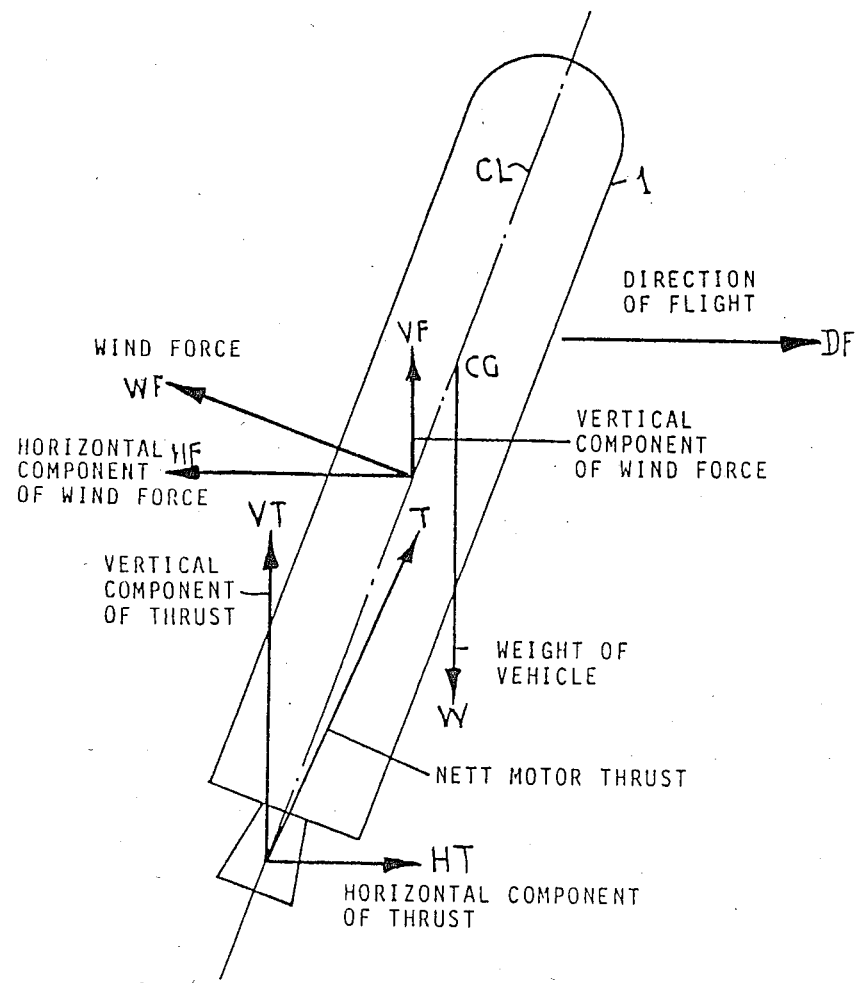

United States Patent [19]

Deans et al.

[11] Patent Number: 4,562,980

[45] Date of Patent: Jan. 7, 1986

[54] ROCKET VEHICLE

[75] Inventors: Arnold L. Deans, Tea Tree Gully; Alan J. Smith, East Bentleigh; Malcolm J. Crozier, Balwyn, all of Australia

[73] Assignee: The Commonwealth of Australia, Canberra, Australia

[21] Appl. No.: 396,914

[22] PCT Filed: Nov. 11, 1981

[86] PCT No.: PCT/AU81/00160

§ 371 Date: Jul. 2, 1982

§ 102(e) Date: Jul. 2, 1982

[87] PCT Pub. No.: WO82/01745

PCT Pub. Date: May 27, 1982

[30] Foreign Application Priority Data

Nov. 14, 1980 [AU] Australia ............... PE6501

[51] Int. Cl.$^4$ .......................... F41G 7/00; F02K 1/00
[52] U.S. Cl. ...................... 244/3.22; 60/230
[58] Field of Search ............ 60/230, 242, 228; 239/265.19; 244/3.21, 3.22, 3.23, 3.3

[56] References Cited

U.S. PATENT DOCUMENTS

| 3,096,049 | 7/1963 | Karasinski | 60/230 |
|---|---|---|---|
| 3,369,772 | 2/1968 | Eberlein | 244/3.2 |
| 3,786,993 | 1/1974 | Burgess et al. | 239/265.19 |
| 3,926,390 | 12/1975 | Teuber et al. | 244/3.22 |
| 3,986,683 | 10/1976 | Ellison | 244/3.22 |
| 4,023,749 | 5/1977 | McCorkle, Jr. | 244/3.22 |
| 4,131,246 | 12/1978 | Rotmans | 244/3.22 |
| 4,143,837 | 3/1979 | Thunholm | 244/3.22 |
| 4,274,610 | 6/1981 | Bastian | 244/3.22 |
| 4,432,512 | 2/1984 | Young | 244/3.22 |

FOREIGN PATENT DOCUMENTS

| 135760 | 12/1950 | Australia . | |
|---|---|---|---|
| 261487 | 6/1960 | Australia . | |
| 443054 | 2/1973 | Australia . | |
| 1199663 | 8/1965 | Fed. Rep. of Germany | 244/3.22 |
| 2649672 | 5/1978 | Fed. Rep. of Germany | 244/3.22 |
| 1230760 | 5/1971 | United Kingdom . | |

OTHER PUBLICATIONS

Annual Report of the Weapons System Research Laboratory, Salisbury, South Australia, 1978–79, pp. 6, 7 and 27–29.

Primary Examiner—Charles T. Jordan
Attorney, Agent, or Firm—Cushman, Darby & Cushman

[57] ABSTRACT

A self-propelled rocket vehicle (1) in which ramp tabs (R1, R2, R3) are provided to control pitch and roll and vane tabs (V1, V2) provided to control spin. The ramp tabs comprise an array of generally symmetrically spaced tabs (R1, R2, R3) mounted on the vehicle and displaceable into the nozzle efflux (E) to control rotation of the vehicle about the roll axis (RA) and pitch axis (PA). The vane tabs (V1, V2) are placed symmetrically about the ramp tabs and are angled such that, when displaced into the nozzle efflux (E), spin in either direction about the vehicle longitudinal axis (SA) results. Overall control is achieved by an auto-pilot controlling actuators driving the ramp tabs and vane tabs to produce the desired thrust vectoring and spin control with the height of the vehicle being controlled by a height controller connected through a limiter to all ramp tabs to minimize loss of attitude control.

14 Claims, 7 Drawing Figures

ROCKET VEHICLE

This invention relates to a flight vehicle capable of controlled movement in the earth's atmosphere. This vehicle uses a single solid or liquid propellant rocket motor fitted to an airframe to product stable motion in both vertical and horizontal planes. No appendages such as wings or fins are required and the only control elements are control surfaces within the nozzle efflux, and hereinafter referred to as the "efflux".

Many rockets are fitted with gimballing nozzles, spoiler tabs and vane tabs of varying geometry to achieve the thrust vectoring and spin control needed to follow a desired flight path. Mostly they are used on high speed vehicles and often only during the boost phase. The prime direction of motion of these vehicles is along the rocket nozzle axis.

The object of the invention is to achieve low velocity horizontal flight with the main vehicle axis vertical or near vertical, the vertical component of thrust providing the vertical movement and supporting the vehicle mass at a desired height. A typical flight path would be ascent to a desired height followed by a controlled flight path within a horizontal plane and terminating, if needed, in a controlled descent.

The object of the invention is achieved only if the attitude of the vehicle is controlled very accurately to balance the flight loads. The method of achieving the control is to provide an excess in thrust over that nominally required for the desired flight and to use a combination of tabs and vanes inserted into the efflux to modulate the effective thrust under the control of an autopilot.

The controlled operation of the tabs and vanes provides a four component control system, namely, moments about three axes of the vehicle and thrust magnitude. The desired flight profile can be achieved by using a minimum of three ramp tabs to be described later, arranged generally symmetrically around the nozzle exit. The heading of the vehicle is controlled by a pair of vane tabs.

The method of controlling a rocket vehicle according to this invention comprises projecting generally symmetrically spaced spoiler ramp tabs both collectively and, yet differentially as required into the efflux to control lift and direction, and alternatively projecting oppositely directed rotation producing tab vanes into the efflux to control a rotation about the vehicle longitudinal axis.

A rocket vehicle with controlled lift heading and bearing correction comprises a series of generally symmetrically spaced spoiler ramp tabs mounted on the vehicle to be projectable into the efflux from the discharge nozzle and inclined rearwardly to the efflux to achieve spoiler and attitude effects, and rotation producing tab vanes which are angled so that when one or other is projected into the efflux, rotation of the vehicle in one or other direction about the vehicle longitudinal axis results.

To enable the nature of the invention to be fully appreciated, an embodiment will now be described with reference to the accompanying drawings, but it is understood that the invention need not necessarily be limited to the form shown.

In the drawings

Figure 2:
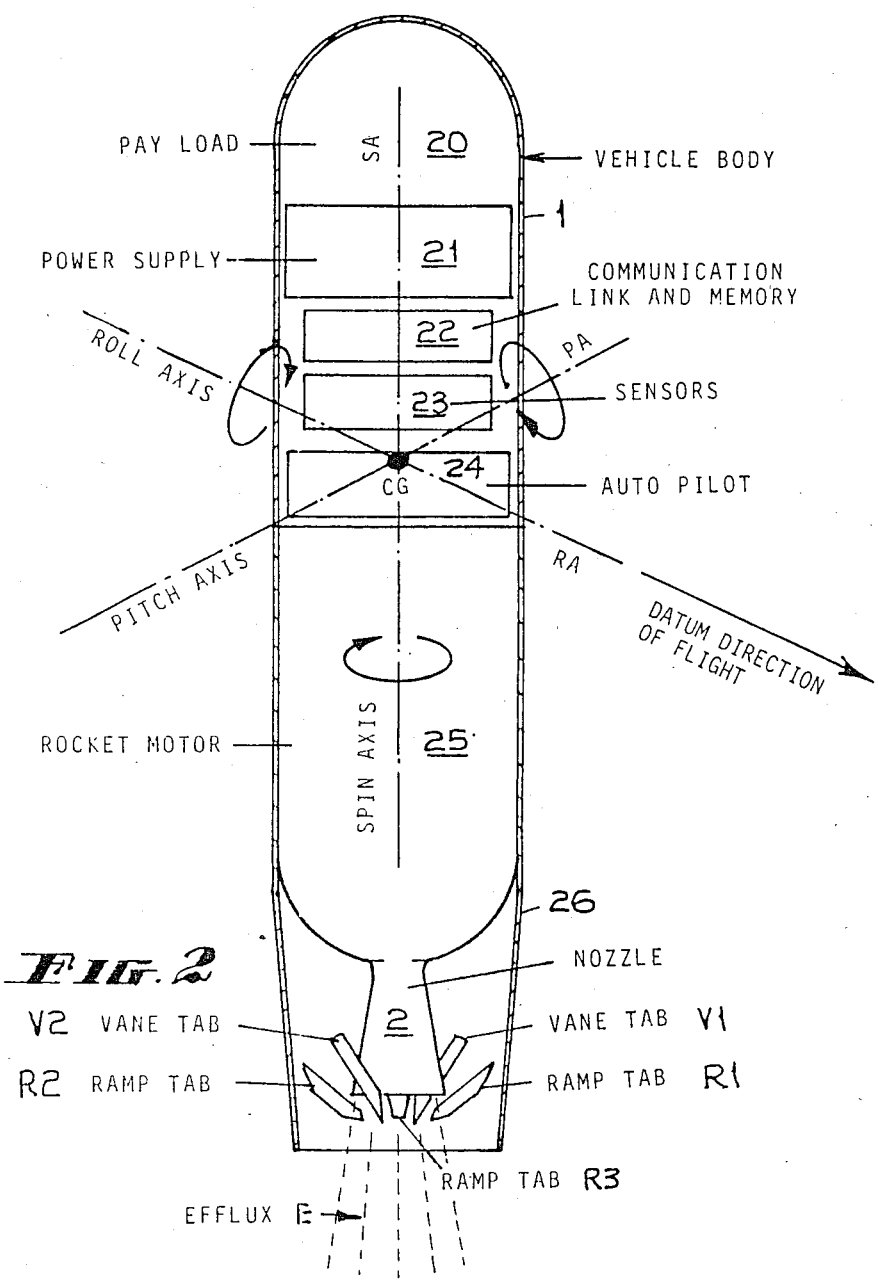

FIG. 1 is a schematic view showing how a balance of flight loads is achieved when generally horizontal movement is required, FIG. 2 is a schematic view of the vehicle showing a preferred arrangement of tabs relative to the vehicle axes.

Figure 3:
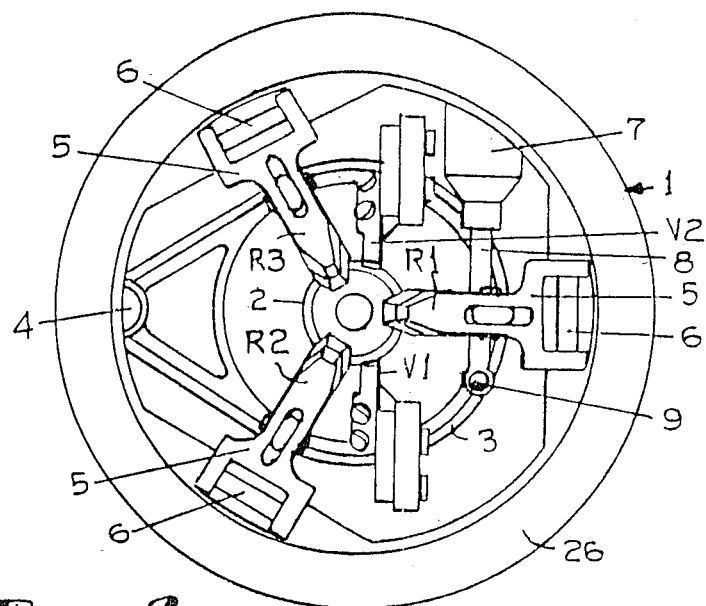
Figure 4:
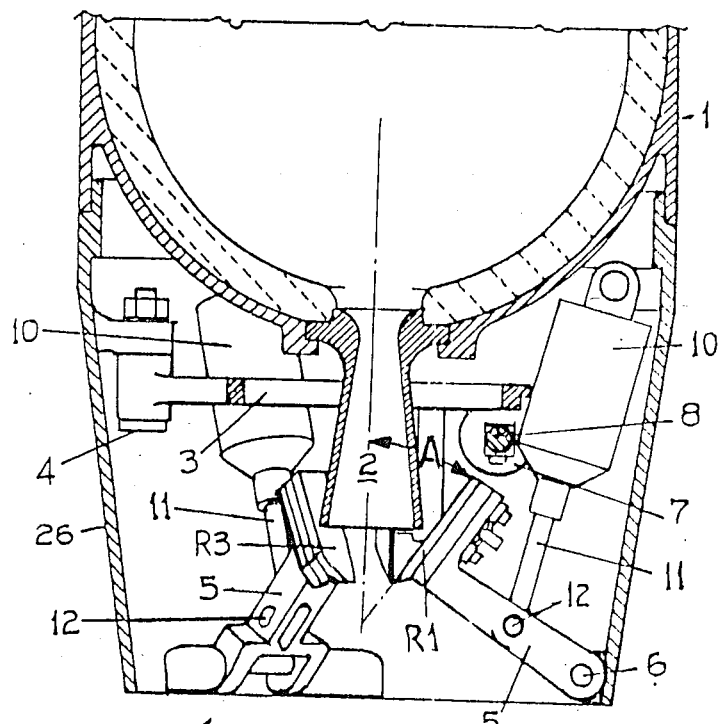
Figure 5:
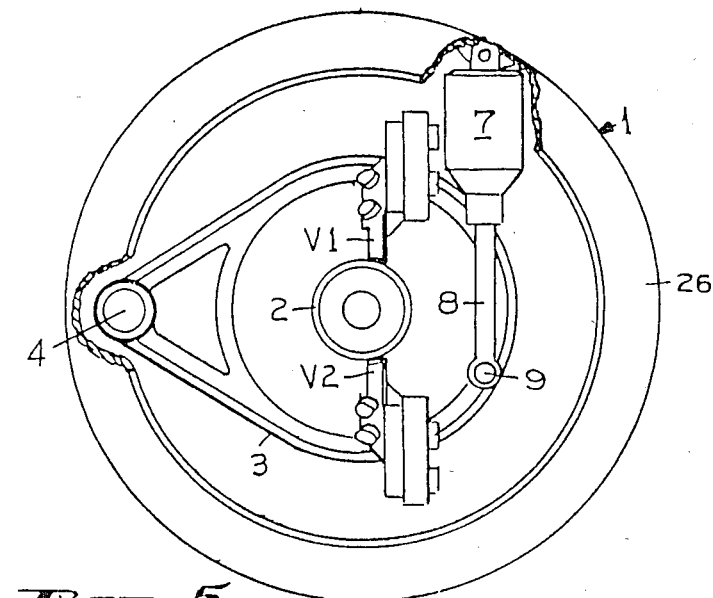
Figure 6:
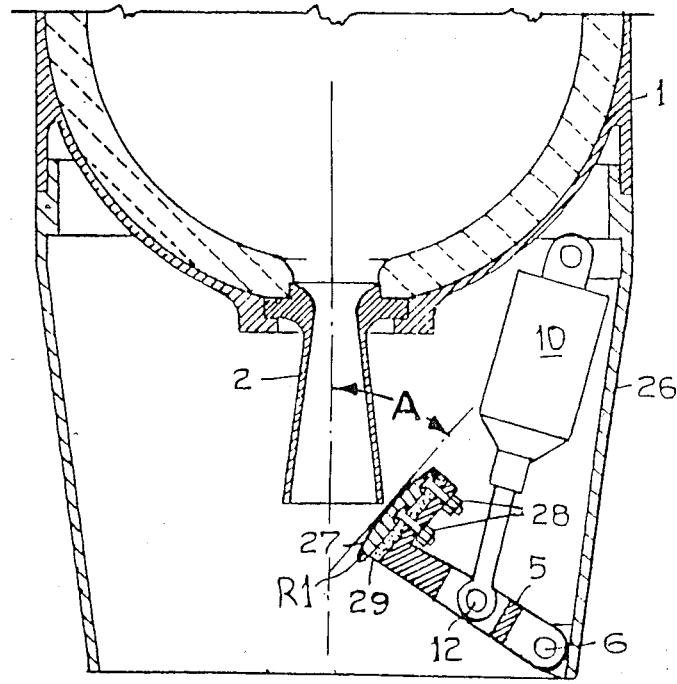
Figure 7:
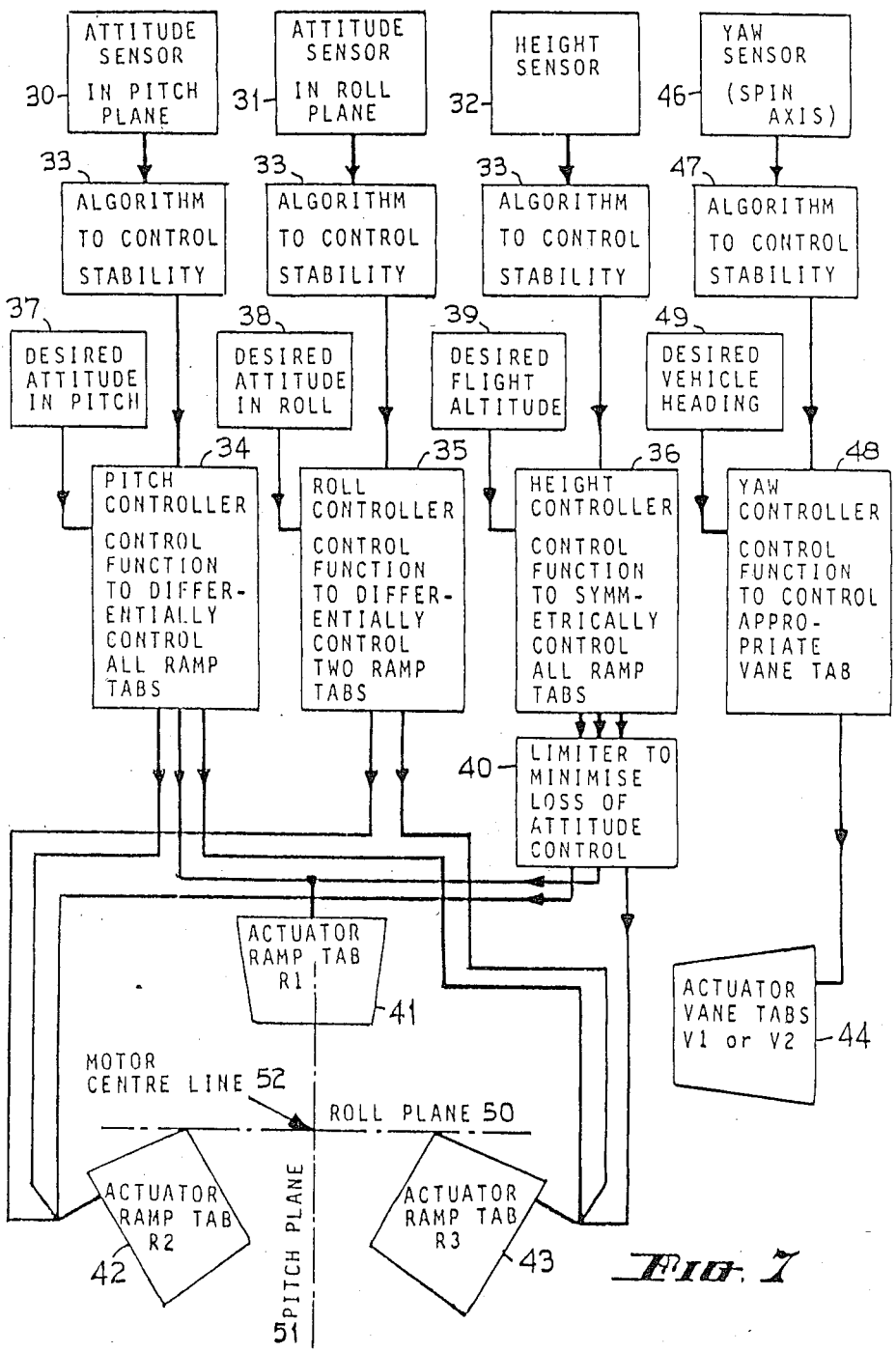

FIG. 3 is a rear view of the rocket showing the ramp tab and vane tab arrangement arranged about the nozzle, FIG. 4 is a longitudinal central section of the rear end of the rocket to illustrate particularly the ramp tab mounting and actuating means, FIG. 5 is a rear view similar to FIG. 3 but showing only the vane tabs and their mounting and actuating means, FIG. 6 is a longitudinal sectional view similar to FIG. 4 but showing only one ramp tab of a modified shape, and FIG. 7 is a block diagram showing how the various tabs are controlled.

FIG. 1 shows that the flight loads are:
(a) the weight acting vertically along the axis W from the vehicle centre of gravity CG.
(b) the wind force WF acting normally to the vehicle body centre line CL through the centre of pressure. This force is the resistance to generally horizontal movement of the body in the air.
(c) the nett motor thrust T acting at a small angle to the vehicle centre line.

A balance of flight loads is achieved at a given air speed by tilting rocket the vehicle body 1 until the horizontal component of thrust HT equals the horizontal component of the wind force WF. To achieve a balance in this position the vertical component of thrust VT must be modulated to equal the weight less the vertical component of wind force and also the direction of the thrust line must provide a moment to balance the moment of the wind force about the centre of gravity CG.

Thus for a desired speed of horizontal flight the vehicle attitude (tilt angle to vertical) as well as the magnitude and direction of thrust must be set and controlled.

This is achieved as shown particularly in FIG. 2 by using at least three ramp tabs R1, R2, and R3 arranged to project at varying distances or varying angles into the efflux E of the rocket vehicle to control vehicle lift, and by a vane tab assembly V1 and V2 which control orientation of the rocket vehicle about the longitudinal axis SA.

The multiple ramp tab arrangement preferably consists of three symmetrically spaced ramp tabs R1, R2 and R3 as shown which are inclined rearwardly to the efflux E from the rocket vehicle body 1 and serve as spoilers. The ramp tabs R1, R2 and R3 control rotation about axes normal to the longitudinal axis SA and to each other and referred to herein as the roll axis RA and the pitch axis PA.

Rotation about the longitudinal axis SA is by the two vane tabs V1 and V2 which have their leading edges swept rearwards and which are placed symmetrically about the ramp tab R1, and these vane tabs V1 and V2 are normally positioned outside of the efflux E but can be moved so that one or the other projects into the efflux to the required amount, the vane tabs V1 and V2 being angled to the longitudinal axis SA in such a manner that one gives clockwise rotation about the longitudinal axis SA and the other gives anticlockwise rotation about that axis. As shown in FIG. 3 the vane tabs V1 and V2 can be mounted on a support 3 pivoted to the body of the rocket vehicle 1 1 outside of the efflux E, the pivot 4 on the frame being medial to the mounting of the ramp tab R1.

These could be operated independently, or a single vane tab with means to vary its angle could be used.

Each of the ramp tabs R1, R2 or R3 is moved by electrical motor means into the efflux along or approximately in the direction of the incline of the tab, which can be achieved with a linear motion but preferably by pivoting supporting arms 5 as shown in FIG. 4 such that gas pressure load on each tab is supported on its pivot which is designated 6. This gas pressure load on the tab is thus transferred to the body of the rocket or vehicle and the actuating load is kept small.

The vane tabs V1 and V2 are moved by electrical motor means 7 pivoted to the body of the rocket vehicle 1, the actuating rod 8 being connected to the support member 3 by a pivot pin 9, while the ramp tabs R1, R2 and R3 are each moved by motor means 10, one for each ramp tab, the actuating rods 11 of the motor means being connected by pivot pins 12 to the arms 5 which carry the ramp tabs.

In operation, when a ramp tab is inserted into the efflux an inclined shock is generated from the junction of the boundary of the efflux and the tab surface. The gas pressure load on the tab behind this inclined shock has two effective control components, one which opposes the axial thrust of the rocket and the second which produces a moment about the centre of mass of the vehicle in the plane of that tab, that is, control of thrust magnitude and vehicle attitude in that plane.

The advantage of inclining the tab surface to the efflux is that:

(1) the proportion of spoilage and attitude control forces can be varied by design;
(2) the durability of the material from which the tab is made is greater in a given high temperature gas stream compared with a tab which is inserted perpendicular to the efflux. The latter is the usual arrangement in other known devices;
(3) the spillage flow through the gap between the nozzle exit and the tab surface is much smaller and at lower velocity than through a gap to a tab perpendicular to the efflux.

The tab can be shaped to produce a desired insertion performance characteristic, but the angle of the tab surface to the boundary stream-line of the efflux preferably should not exceed 50°. With a pivoted tab this maximum occurs when the tab just enters the efflux. The minimum angle for a useful performance is 20°. For the range of nozzle geometry configuration envisaged, this leads to a range of angle of the tab surface to the nozzle axis, shown as angle A in FIGS. 4 and 6, between 50° and 10°.

The gap between the tab and the nozzle is not critical but should be adequate to permit movement due to motor pressure and thermal effects of one relative to the other and also to ensure clearance over the whole range of tab movement. This gap is at a minimum for a hinged planar tab when the tab is either just entering the efflux or is fully entered. The tab may be curved to a radius about the pivot as shown in FIG. 6. This arrangement has a fixed tab-nozzle gap for all tab locations and provides a focussing of all static gas pressure loads on the main surface of the tab onto the pivot point. This focussing eliminates gas pressure load moments about the pivot and only viscous forces (including some small pressure forces on other tab surfaces) arising from flow along the face of the tab need be overcome in operating the tab.

Variations in the combinations of the three ramp tabs inserted enables a control of the rocket thrust magnitude and control of the attitude of the vehicle in each of the two mutually perpendicular axes PA and RA to be independently exercised.

The two vane tabs V1 and V2 are, as said, mounted on a single support member 3 to be out of the efflux in a neutral position. Movement of this support member 3 introduces one or the other of these tabs into the efflux. Each vane is at a fixed angle to the efflux such that shock front generated at the sharp leading edge produces a gas pressure load acting effectively on one face of the vane. This gas load provides a moment about the rocket nozzle axis. As the vanes are angled in different directions the insertion of one or the other provides as said either clockwise or counterclockwise moments. The leading edge of the vane is swept rearward in relation to the efflux.

The durability of the vane tab to a given high temperature gas stream is enhanced by this arrangement where the tabs are only intermittently inserted into the efflux and by the sharp swept leading edge of the vane.

The combination of three ramp tabs and two vane tabs provides a geometrical arrangement minimizing, within the control range, the likely interference of the shock boundaries from each. This is aided by the rearward sweep of the vanes and the location of the vanes in relation to the ramp tabs. However, a considerable increase in the thrust spoilage component of performance can be acquired by over-insertion of ramp tabs so that the boundaries of the shock envelopes interfere with each other to the extent that a Mach disc flow condition is established.

The actuation of the multi-tab system can be by electrical, pneumatic or hydraulic actuators, the form shown being electrical and comprising a motor acting on a screwed shaft.

The control system, to be later described herein with reference to FIG. 7, is an auto-pilot to control vehicle attitude and therefore giving stability of the vehicle along the prescribed flight path. The sensing of vehicle attitude can be by various methods, for example a pendulum or attitude gyroscope. The preferred method is to use a rate gyroscope and accelerometer to control attitude in each of two planes along the vehicle axis together with a barometric pressure sensor and/or accelerometer along the nozzle axis.

The positioning of the various components can be as shown dotted in FIG. 2 rocket vehicle body 1 houses a payload 20, a power communication link and memory 22, sensors 23 and an auto pilot 24. The rocket motor 25 in the lower portion of the rocket vehicle ejects the efflux E through the nozzle 2, the ramp tabs R1, R2 and R3 and the vane tabs V1 and V2 being housed in an extension 26 forming part of the rocket vehicle body 1 around the nozzle 2.

The communications link and memory 22 are used to inject and store data determining the required mission profile. The vehicle flight requirements are compared in the auto-pilot 24 with the outputs of a combination of attitude, acceleration and rate sensors to provide vehicle maneuver requirements such that the projected flight profile can be achieved. This is effected by the auto-pilot controlling the actuators driving the thrust control mechanism to produce the desired thrust spoilage, side force and rotational moments.

In the form shown in FIG. 6 the ramp tab R1 is shown with a curved active face member 27 held to the arm 5 by bolts 28 with an insulating shield 29 between the active face member 27 and the arm 5. The actual shape of the active surface can be varied as can the number of ramp tabs provided a sufficient number, not less than three, are spaced around the nozzle 2.

The arcuate movement shown is a practical solution but the ramp tabs R1, R2 and R3 could be moved in a planar fashion, or the ramp tabs could be otherwise moved to vary interception of the efflux E from the nozzle 2, but in a manner such that excessive operating force is avoided.

The block diagram designated FIG. 7 shows how the ramp tabs and the vane tabs are actuated.

The three ramp tabs R1, R2 and R3 are operated by the controller comprising an attitude sensor 30 which operates in the pitch plane normal to the pitch axis PA, an attitude sensor 31 which operates in the roll plane normal to the roll axis RA, and a height sensor 32, each of these sensors being coupled via algorithms 33 to control stability and these in turn are coupled to the pitch controller 34, the roll controller 35, and the height controller 36. These in turn are directed by demand members 37, 38 and 39, the purpose of these being to ensure that the rocket has the desired attitude in pitch and in roll fed to it as well as the height required. The demand member 37 determines the desired attitude in pitch, the demand member 38 determines the desired attitude in roll, and the demand member 39 determines the desired flight altitude.

The height controller 36 operates through a limiter 40 to minimize loss of attitude control and it will be noted that the pitch controller is connected to the actuator of each of the ramp tabs R1, R2 and R3. The roll controller is connected only to the actuator of the ramp tabs R2 and R3.

The height controller 36 is connected through the limiter 40 to the actuators of all three ramp tabs R1, R2 and R3. The actuators are designated respectively 41, 42 and 43.

The vane tabs V1 or V2, which, as will be seen from the description of the mechanism itself, can be projected into the efflux so that either V1 or V2, depending on the direction of correction required about the longitudinal axis, are moved by the actuator 44 under the control of a yaw controller 48 fed by a yaw sensor 46 which detects about the longitudinal axis SA and, as in the other cases, is coupled via an algorithm 47 to provide the correction needed to achieve the heading defined by the demand member 49.

The control system as referred to earlier herein, is an autopilot to control the vehicle attitude and height and to provide stability of the vehicle along the prescribed flight path. The sensing of the vehicle attitude can be by various methods, for example a pendulum or two axis vertical gyroscope can be used to sense the magnitude of angles from the vertical in the pitch and roll planes respectively, and a barometric capsule used to provude a measure of pressure height. The outputs of these sensors are compared with the desired attitude angles within the autopilot to provide signals to the actuators in order that the required forces are produced. In the example described, corrections to the pitch angle would be achieved by tab R1 being driven in one direction whilst tabs R2 and R3 are driven in the opposite direction. Stability of this attitude control loop would in this example be achieved by electronic differentiation, over a limited bandwidth, of the pitch angle signal to produce a psuedo rate correction. For correction to the roll angle tab R2 would be driven in one direction and tab R3 in the opposite. Again the electronic differentiation of the roll angle is used to provide a stability term. For height control the output of the height sensor is compared with a signal representing the required height and this used to produce true signals to the actuators controlling tabs R1, R2 and R3 such that if the vehicle is below the required height then the tabs will be driven to a position such that the thrust is increased. A rate of climb signal, to provide stability of the height loop can be obtained by the electronic integration of an instrument fitted to measure the acceleration of the vehicle along its longitudinal axis.

In order to control the vehicles attitude around the longitudinal axis a single axis rate gyroscope is used to measure the rate of rotation around the longitudinal axis. Angular position information can be obtained by electronically integrating the output of the gyroscope. Again the position information would be compared in the autopilot with a signal representing the required angular position and this used to provide a signal to the actuator controlling the position of vanes V1 and V2 such that the required vane is driven to a position to provide a torque about the longitudinal axis and restore the vehicle to its required angular position. In this case the output from the rate gyroscope would be used to provide the required stability terms.

A preferred autopilot arrangement may be to use rate gyroscopes to sense the rates of rotation around the pitch axis and roll axis and for the autopilot to use these signals together with additional acceleration data to control the vehicle position and attitude.

It should be noted that it is possible to control the vehicle with different combinations of transducers and for the measurement reference angles to be other than those described herein. For example there is no requirement for the pitch angle to be in the same plane as the motion of of tab R1. As long as the relationship between the measured angles and the motion of the tabs and vanes is known then an autopilot can be arranged to control the vehicles attitude and position against time.

The claims defining the invention are as follows:

1. The method of controlling the flight including in a substantially horizontal plane of a primarily vertically oriented rocket vehicle which includes a nozzle discharging an efflux, said method comprising projecting generally symmetrically spaced inwardly rearwardly projecting spoiler ramp tabs both collectively yet differentially into the efflux of the discharge nozzle to control lift and direction, and projecting rotation producing tab vane means between the ramp tabs into the efflux to control a rotation about the vehicle longitudinal axis whereby rotation is controlled independently of the lift and direction control.

2. The method of controlling a rocket according to claim 1 in which three ramp tabs are used, wherein
    (a) attitude in a pitch plane is controlled by a pitch controller connected to actuate all of the said ramp tabs,
    (b) attitude in a roll plane is controlled by a roll controller connected to actuate two of the said ramp tabs,
    (c) height is controlled by means of a height controller connected to actuate all of the said ramp tabs through limiter means arranged to minimize loss of attitude control.

3. The method of controlling a rocket according to claims 1 or 2 wherein rotation about the longitudinal axis is controlled by means of a yaw controller connected to at least a vane tab arranged to project into the efflux to give selected control.

4. The method of controlling a rocket according to claim 1 wherein rotation about the longitudinal axis is controlled by means of a yaw controller connected to a pair of vane tabs arranged about one of said ramp tabs and on opposite sides of the said efflux, said vane tabs being arranged to correct opposite rotation about the longitudinal axis, and projecting one or the other of said vane tabs into the said efflux according to the correction required.

5. The method of controlling a rocket according to claim 2 wherein
   (a) the said pitch controller achieves the required attitude in pitch using inputs from an attitude sensor and a desired pitch demand,
   (b) the said roll controller achieves the required attitude in roll using inputs from a roll sensor and a desired roll demand, and
   (c) the said height controller achieves the required altitude using inputs from a height sensor and a desired height demand.

6. The method of controlling a rocket according to claim 4 wherein the vehicle bearing is achieved using inputs from a yaw sensor and a desired vehicle bearing demand.

7. A rocket vehicle with controlled lift and rotation correction comprising a body, a nozzle which in operation discharges an efflux and a series of generally symmetrically spaced spoiler ramp tabs mounted on the vehicle body to be projectable into the efflux from the discharge nozzle to achieve spoiler and attitude effect, said spoiler ramp tabs being inclined inwardly and rearwardly in the form of a ramp, and rotation producing tab vane means angled so that, when projected into the efflux, rotation in the desired direction about the vehicle longitudinal axis results.

8. A rocket according to claim 7 wherein three symmetrical spoiler ramp tabs are used, and two rotation producing tab vanes are arranged symmetrically about one of the said spoiler ramp tabs.

9. A rocket vehicle according to claim 7 wherein a pair of rotation producing tab vanes are used which are oppositely angled in relation to the efflux, and mounting means to allow projection of a selected tab vane into the efflux to obtain rotation of the vehicle about the longitudinal axis.

10. A rocket according to claim 9 wherein the rotation producing tabs are mounted to rotate back and forth about a pivot so that in one position the one tab with clockwise reaction angle is projected into the efflux and in an opposite position the other tab with anti-clockwise reaction angle is projected into the efflux whereby in the neutral position neither tab is inserted.

11. A rocket vehicle according to claim 9 wherein the said tab vanes are mounted on a support member pivoted to the said rocket vehicle body to move laterally with respect to the efflux, said tabs being mounted on the said support member on opposite sides of the said discharge nozzle and means to move the said support member to project either of the said vane tabs into the path of the said efflux.

12. A rocket vehicle according to claim 7 wherein said ramp tabs are mounted on arms pivoted to a support on the said rocket vehicle body so as to angularly deflect the efflux from the said discharge nozzle, the arms being pivoted by motor means connected between the said arms remote of the said pivots and the said support.

13. A rocket vehicle according to claim 12 wherein the surface of the ramp tabs which deflects the said efflux is curved.

14. A rocket vehicle according to claim 7 comprising control sensors within the said body to sense attitude, height and yaw, a rearwardly opening extension forming part of said body, the extension surrounding said nozzle and housing said series of actuator ramp tabs within said extension, the ramp tabs being symmetrically arranged about the said nozzle, means to support said ramp tabs from the said body extension by pivoted arms positioned to cause the said ramp tabs to be projectable into and retractable from efflux issuing from said nozzle, motor means to move the said arms, there being a pair of said vane tabs carried on a support member pivoted to the said extension to allow one or the other vane tab to be projected into the efflux, said vane tabs being angled to control rotation in the desired direction about the longitudinal axis of the said rocket vehicle, and means connecting the control sensors to the motor means to control the flight of the said rocket vehicle.

* * * * *